US006088574A

United States Patent [19]

Makino

[11] Patent Number: 6,088,574

[45] Date of Patent: Jul. 11, 2000

[54] RADIO COMMUNICATION APPARATUS HAVING A FUNCTION FOR VISUALLY DISPLAYING THE NUMBER OF CHARACTERS FOR EACH MESSAGE WITH ANALOG REPRESENTATION

[75] Inventor: Tetsuya Makino, Shizuoka, Japan

[73] Assignee: NEC Corporation, Tokyo, Japan

[21] Appl. No.: 09/046,699

[22] Filed: Mar. 24, 1998

[30] Foreign Application Priority Data

Mar. 25, 1997 [JP] Japan .................................... 9-072377

[51] Int. Cl.[7] ........................................................ H04Q 7/06

[52] U.S. Cl. ....................... 455/31.1; 455/31.2; 455/31.3; 340/825.44

[58] Field of Search ................................. 455/38.4, 38.1, 455/31.1, 228, 566; 340/825.44, 311.1; 345/35, 38, 140, 141, 31.2

[56] References Cited

U.S. PATENT DOCUMENTS

| | | | |
|---|---|---|---|
| 4,821,021 | 4/1989 | Ide et al. | 340/311.1 |
| 4,914,393 | 4/1990 | Yoshido | 324/428 |
| 5,212,477 | 5/1993 | Indekeu et al. | 340/825.44 |
| 5,323,148 | 6/1994 | Olazabal et al. | 455/38.4 |
| 5,488,359 | 1/1996 | Faris et al. | 340/825.44 |
| 5,758,280 | 5/1998 | Kimura | 455/412 |
| 5,842,123 | 11/1998 | Hamamoto et al. | 455/412 |

FOREIGN PATENT DOCUMENTS

| | | |
|---|---|---|
| 63-158925 | 7/1988 | Japan . |
| 63-126947 | 8/1988 | Japan . |
| 2-7729 | 1/1990 | Japan . |
| 4-169970 | 6/1992 | Japan . |
| 4-257040 | 9/1992 | Japan . |
| 7-143536 | 6/1995 | Japan . |
| 7-160692 | 6/1995 | Japan . |
| 61-59924 | 3/1996 | Japan . |

OTHER PUBLICATIONS

Japanese Office Action dated May 25, 1999 with partial translation

*Primary Examiner*—Wellington Chin
*Assistant Examiner*—Yemane Woldetatios
*Attorney, Agent, or Firm*—McGinn & Gibb, P.C.

[57] ABSTRACT

In a radio-paging receiver comprising a receiving arrangement (11, 12, 13) for successively receiving messages included in selective call signals as received messages, a received message storing area (202) for storing the received messages as stored messages, a character number information storing area (204) for storing the number of characters for each of the stored messages as a stored character number, an LCD (19) visually displays the stored character number for each of the stored messages with analog representation. The analog representation may be graphical representation, which is, for example, performed by using a bar graph.

18 Claims, 11 Drawing Sheets

19a 1
2
3
4
19
19a 5
6
7
8
19
19a

×
△
□
19

WAIT STATE
19a 1
2
3
4
19

19a
1
2
3
4
19

19a
2
3
4
5
19
PAGE SCROLLING
19a 5
6
7
8
19

19a
9
10
11
19
WAIT STATE

RADIO COMMUNICATION APPARATUS HAVING A FUNCTION FOR VISUALLY DISPLAYING THE NUMBER OF CHARACTERS FOR EACH MESSAGE WITH ANALOG REPRESENTATION

BACKGROUND OF THE INVENTION

This invention relates to a radio communication apparatus for receiving a selective call signal, which includes a message. The radio communication apparatus may be a radio-paging receiver, a transceiver, or the like although description will mainly be directed to the radio-paging receiver.

A radio-paging system comprises a plurality of radio-paging receivers and a plurality of base stations each for transmitting a selective call signal. A radio-paging receiver of the type described includes a receiving circuit for carrying out a receiving operation of selectively receiving the selective call signal specific to the apparatus. The receiving circuit produces a received signal whenever the receiving circuit receives the selective call signal specific thereto.

The selective call signal may include a message and the radio-paging receiver may include a memory and a visual display device. In this event, the radio-paging receiver receives the massage as a received massage in the receiving circuit, stores the received massage in the memory as a stored massage, and visually displays the stored massage on the visual display device by reading the stored massage out of the memory in response to an instruction of a user or a possessor thereof. Inasmuch as selective call signals including respective messages are successively received in the receiving circuit of the radio-paging receiver, the memory thereof stores received messages as stored or accumulated messages. In the radio-paging receiver of the type described, inasmuch as the memory has a finite or limited storage capacity, it is necessary to delete an unnecessary one in the stored messages from the memory when the storage capacity of the memory is insufficient. Under the circumstances, it is convenient or helpful to carrying out deletion of the unnecessary one in the stored messages by the user before a remaining usable storage capacity in the memory is running out.

In order to cope with this, a radio-paging receiver or an individual selective call receiver is published in Japanese Examined Patent Publication of Tokkou No. Hei 3-8,607 or JP-B 3-8,607 (which will be herein called a first reference) on Feb. 6, 1991 which is hereby incorporated herein by reference. The radio-paging receiver according to JP-B 3-8,607 accumulates the total number of characters for the stored massages as an accumulated character number and visually displays the accumulated character number on the visual display device.

On the other hand, in order to easily handle the radio-paging receiver, it is important for the radio-paging receiver that how to read the stored massages out of the memory without difficulty. From this point of view, proposal is made about another radio-paging receiver wherein each part of each stored massage is visually displayed page by page on the visual display device. In order to find a desired page, the user or the possessor repeatedly carries out a message progressive switching operation indicative of advancing the page to be displayed to the next page and a message back feed switching operation indicative of returning the page to be displayed to the previous page.

In the above-mentioned conventional radio-paging receivers, the user must operate the radio-paging receiver to select a suitable one of the accumulated messages to delete it when the remaining usable storage capacity of the memory decreases. In addition, each of the stored messages comprises a plurality of characters and the stored messages have lengths of characters that are generally different from one another. That is, a received message has a short length of characters while another received message has along length of characters. However, in the conventional radio-paging receivers, inasmuch as only the accumulated character number is visually displayed on the visual display device, it is difficult for the user thereof to determine that deletion of which message is effective in securing the remaining usable storage capacity of the memory so far as the user sees or watches contents on the visual display device. In order to resolve this problem, those skilled in the art will devise a method for visually displaying the character number for each of the stored messages on the visual display device with numeric representation. In other words, the method visually displays the character number for each of the stored messages on the visual display device with digital representation. However, in such a method, the user must determine large or small of a series of the character numbers for the stored messages that are visually displayed on the visual display device and results in being inconvenient to the user or the possessor thereof.

In addition to the above-mentioned problem, the conventional radio-paging receivers are disadvantageous in that a reading operation for the accumulated massages is inconvenient to the user or the possessor thereof. More specifically, many time and a lot of switching operations are necessary for the users or the possessors in a case of reading the accumulated messages in the conventional radio-paging receivers. This is because the users or the possessors must go through procedures of carrying out an indication of a page for each stored message and of finding an indication of the desired page.

SUMMARY OF THE INVENTION

It is therefore an object of this invention to provide a radio-paging receiver, which is capable of visually displaying the character number for each of received and accumulated massages on a visual display device with a particular mode where a user can know it intuitively.

It is another object of this invention to provide a radio-paging receiver of the type described, wherein a user can easily select an unnecessary one in stored massages that should be deleted.

It is still another object of this invention to provide a radio-paging receiver of the type described, wherein a user can read any massage at or from any point out of a memory to make the user visually display it on a visual display device.

Other objects of this invention will become clear as the description proceeds.

According to an aspect of this invention, a radio communication apparatus successively receives selective call signals. Each selective call signal includes a message, which comprises a plurality of characters. The radio communication apparatus comprises receiving means for successively receiving the messages included in the respective selective call signals as received messages. Connected to the receiving means, message storing means stores the received messages therein as stored messages. Connected to the message storing means, character number storing means stores the number of characters for each of the stored messages therein as a stored character number. Connected to the character number storing means, character number visual displaying means visually displays the stored character number for each of the stored messages thereon with analog representation.

DESCRIPTION OF THE PREFERRED EMBODIMENTS

Figure 1:
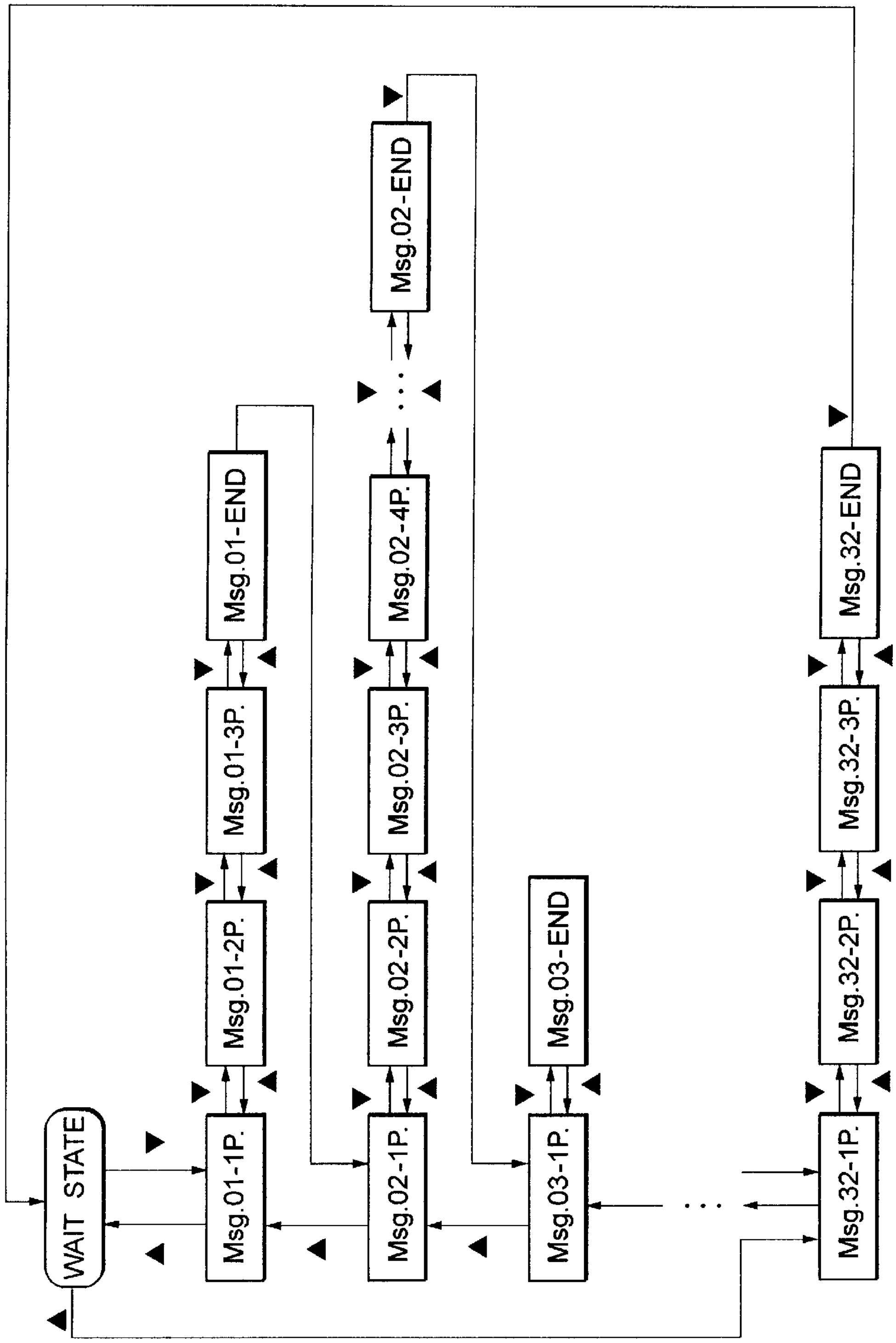
FIG.1 PRIOR ART
FIG. 1 is a state transition diagram for use in describing operation of a conventional radio-paging receiver.

FIG. 1 is a state transition diagram for use in describing operation of a conventional radio-paging receiver which is capable of visually displaying each part of each stored message page by page on a visual display device (not shown). In FIG. 1, it is assumed that the radio-paging receiver comprises a memory (not shown) for storing, as stored messages, first through thirty-second messages Msg.01, Msg.02, Msg.03, . . . , and Msg.32. The first message Msg.01 consists of four pages while the second message Msg.02 consists of X pages, where X represents a positive integer, which is not less than five. The third message Msg.03 consists of two pages while the thirty-second message Msg.32 consists of four pages. In FIG. 1, a box labeled "Msg. 01-1P. " represents a processing for carrying out readout and visual display of a first page in the first message Msg.01. Each of other boxes labeled "Msg." at the beginning represents a similar processing. In addition, a black downward triangular mark, namely, ▼ represents a message progressive switching operation indicative of advancing the page to be displayed to the next page while a black upward triangular mark, namely, ▲ represents a message back feed switching operation indicative of returning the page to be displayed to the previous page.

It will be assumed that the message progressive switching operation is repeatedly carried out from a wait state. In this event, message display is carried out on the four pages of the first massage Msg.01, subsequently, message display is carried out on the X pages of the second massage Msg.02, message display is carried out on the two pages of the third massage Msg.03, . . . , and finally, message display is carried out on the four pages of the thirty-second message Msg.32, and thereafter message display returns to the wait state. When the message back feed switching operation is carried out during message display on the first page of each message, the message display returns to display on the previous message. When the message back feed switching operation is carried out during message display on a specific page on and after the second page of a particular message, the message display returns to display on the page previous to the specific page of the particular message.

With this structure, the conventional radio-paging receiver is disadvantageous in that a reading operation for the stored messages is inconvenient to a user or a possessor thereof, as mentioned in the preamble of the instant specification.

Figure 2:
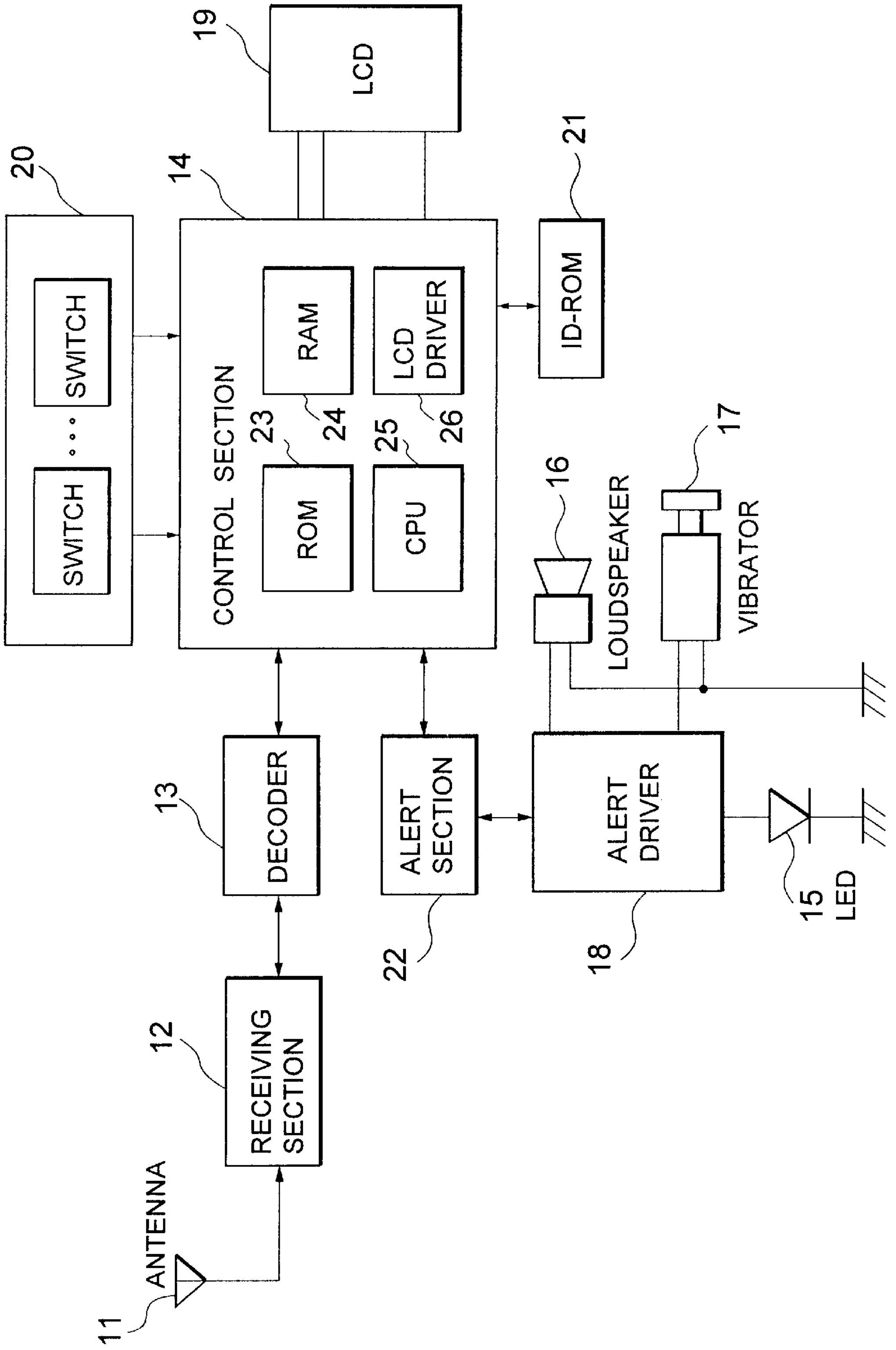
FIG. 2 is a block diagram of radio-paging receiver according to a preferred embodiment of this invention.

Referring to FIG. 2, the description will proceed to a radio-paging receiver according to a preferred embodiment of this invention.

A. Structure of the Radio-paging Receiver

The illustrated radio-paging receiver comprises an antenna 11, a receiving section 12, a decoder 13, a control section 14, a light emission diode (LED) 15, a loudspeaker 16, a vibrator 17, an alert driver 18, a liquid crystal display (LCD) 19, a plurality of switches 20, an identification read-only memory (ID-ROM) 21, and an alert section 22.

A base station (not shown) in a radio-paging system successively transmits a plurality of selective call signals each of which includes a message. Each selective call signal may be a FSK (frequency shift keying) modulated signal. The selective call signals are successively received through the antenna 11 by the receiving section 12. The receiving section 12 successively receives and demodulates the selective call signals to produce demodulated selective call signals. The demodulated selective call signals are successively supplied to the decoder 13. The decoder 13 successively decodes the demodulated selective call signals into decoded selective call signals. The decoded selective call signals are successively supplied to the control section 14. At any rate, a combination of the antenna 11, the receiving section 12, and the decoder 13 serves as a receiving arrangement for successively receiving the messages included in the respective selective call signals as the received messages.

The control section 14 is connected to the decoder 13, the LCD 19, the switches 20, the ID-ROM 21, and the alert section 22. The control section 14 manages control of the whole of the radio-paging receiver in question. A combination of the LED 15, the loudspeaker 16, and the vibrator 17 serves as a reception information alert section. The LED 15, the loudspeaker 16, and the vibrator 17 are connected to the alert driver 18. The alert driver 18 is connected to the control section 14 via the alert section 22 and drives the LED 15, the loudspeaker 16, and the vibrator 17 under the control of the control section 14. Each of the switches 20 generates an interruption to the control section 14. The ID-ROM 21 is used to carry out initialization for the radio-paging receiver in question.

The control section 14 comprises a read only memory (ROM) 23, a random access memory (RAM) 24, a central processing unit (CPU) 25, and an LCD driver 26. The ROM 23 preliminarily stores optional information for optional feature of the radio-paging receiver in question, a program, character fonts, and so on therein. The RAM 24 stores received messages therein as stored messages. The RAM 24 further stores descriptive information, system information, or the like. The LCD driver 26 is for driving the LCD 19.

Now, the description will proceed to operation of the radio-paging receiver illustrated in FIG. 1.

Figure 3:
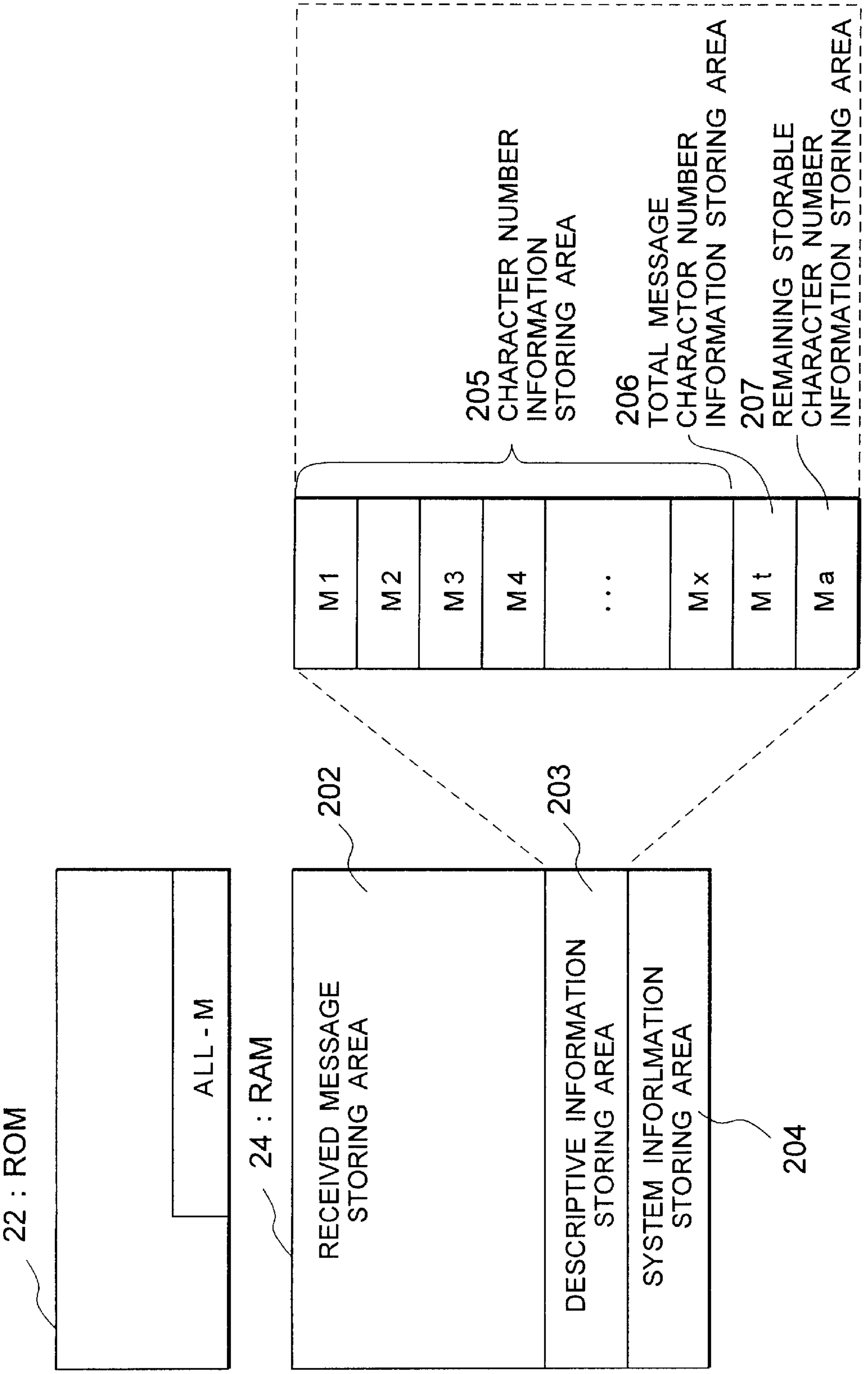
FIG. 3 shows stored contents in a ROM and a RAM for use in the radio-paging receiver illustrated in FIG. 1.

B. Operation of the Radio-paging Receiver (B-1) Management of Character Number Information FIG. 3 shows stored contents in the ROM 23 and the RAM 24. The RAM 24 comprises a received message storing area 202, a descriptive information storing area 203, and a system information storing area 204. The received massages are stored in the received message storing area 202 as stored messages. That is, the received message storing area 202 acts as a message storing arrangement for storing the received messages as the stored messages. Accordingly, the total number of characters for all receivable messages is determined by a storage capacity of the received message storing area 202. The ROM 23 stores the total storage character number ALL-M corresponding to the storage capacity of the received message storing area 202 therein. The total storage character number ALL-M is referred on calculating a remaining storable character number for storable messages on the basis of an accumulated character number for current stored messages.

In addition, the descriptive information storing area 203 of the RAM 24 comprises a character number information storing area 205, a total message character number information storing area 206, and a remaining storable character number information storing area 207.

The character number information storing areas 205 are equal in number to receivable messages in the radio-paging receiver in question. The character number information storing area 205 stores an i-th stored character number Mi indicative of the number of characters for an i-th stored message which is stored in the received message storing area 202, where i represents each of 1 through x which represents a positive integer. The i-th stored character number Mi for the i-th stored message is calculated by counting the number of bits for received data on reception of the message. More specifically, a data cutting bit number is defined as follows. If the received data is represented by an alphanumeric (α-N) code, the data cutting bit number is equal to seven or eight. If the received data is represented by a numeric (N) code, the data cutting bit number is equal to four. If the received data is represented by a special character code such as kanji character code, the data cutting bit number is equal to sixteen or fourteen. The i-th stored character number Mi is calculated by dividing a counted value of the bit number for the received data by the data cutting bit number. At any rate, the character number information storing area 205 is operable as a character number storing arrangement for storing the number of characters for each of the stored messages therein as the character number.

The total message character number information storing area 206 stores a total message character number Mt indicative of the sum total of first through x-th stored character numbers M1 to Mx, namely, the sum total of the number of characters for all stored messages which are stored in the received message storing area 202. The total message character number Mt is called the above-mentioned accumulated character number.

More specifically, it will be presumed that a new message is received in the radio-paging receiver in question. In this event, a character number for the new message is calculated in the manner which is described above. Subsequently, the character number is added to the total message character number Mt previously stored in the total message character number information storing area 206, and then an addition result is returned to the total message character number information storing area 206 as a new total message character number Mt. It will be presumed that a particular message in the stored messages is deleted from the received message storing area 202 by the CPU 25. That is, the CPU 25 is operable as a deleting arrangement for deleting the stored messages from the received message storing area 202. In this event, a character number for the particular message is subtracted from the total message character number Mt previously stored in the total message character number information storing area 206, and then a subtraction result is returned to the total message character number information storing area 206 as the new total message character number Mt. Inasmuch as renewal is carried out in response to reception of the new message or deletion of the particular message, the total message character number information storing area 206 always stores the total message character number Mt indicative of the sum total of the number of characters for all stored messages which are stored in the received message storing area 202. At any rate, the total message character number information storing area 206 serves in cooperation with the CPU 26 as an accumulating arrangement for accumulating the stored character numbers for the stored messages to obtain the accumulated character number Mt.

The remaining storable character number information storing area 207 stores a remaining storable character number Ma indicative of the number of characters which is obtained by subtracting the total message character number Mt from total storage character number ALL-M, namely, a storable character number in the present condition. Inasmuch as the remaining storable character number Ma is uniquely determined by the total storage character number ALL-M and the total message character number Mt, it is not always necessary to provide with the remaining storable character number information storing area 207 for storing the remaining storable character number Ma. And, it therefore dependent on specifications of a program whether or not the remaining storable character number information storing area 207 is provided. At any rate, connected to the total message character number information storing area 206, the CPU 25 acts in cooperation with the ROM 23 as a calculating arrangement for calculating, on the basis of the accumulated character number Mt, the number of characters which enables to store in the received message storing area 202 to produce the remaining storable character number Ma.

(B-2) Visual Display of a Bar Graph or a Bar Chart for Character Numbers

Figures 4A, 4B, 4C:
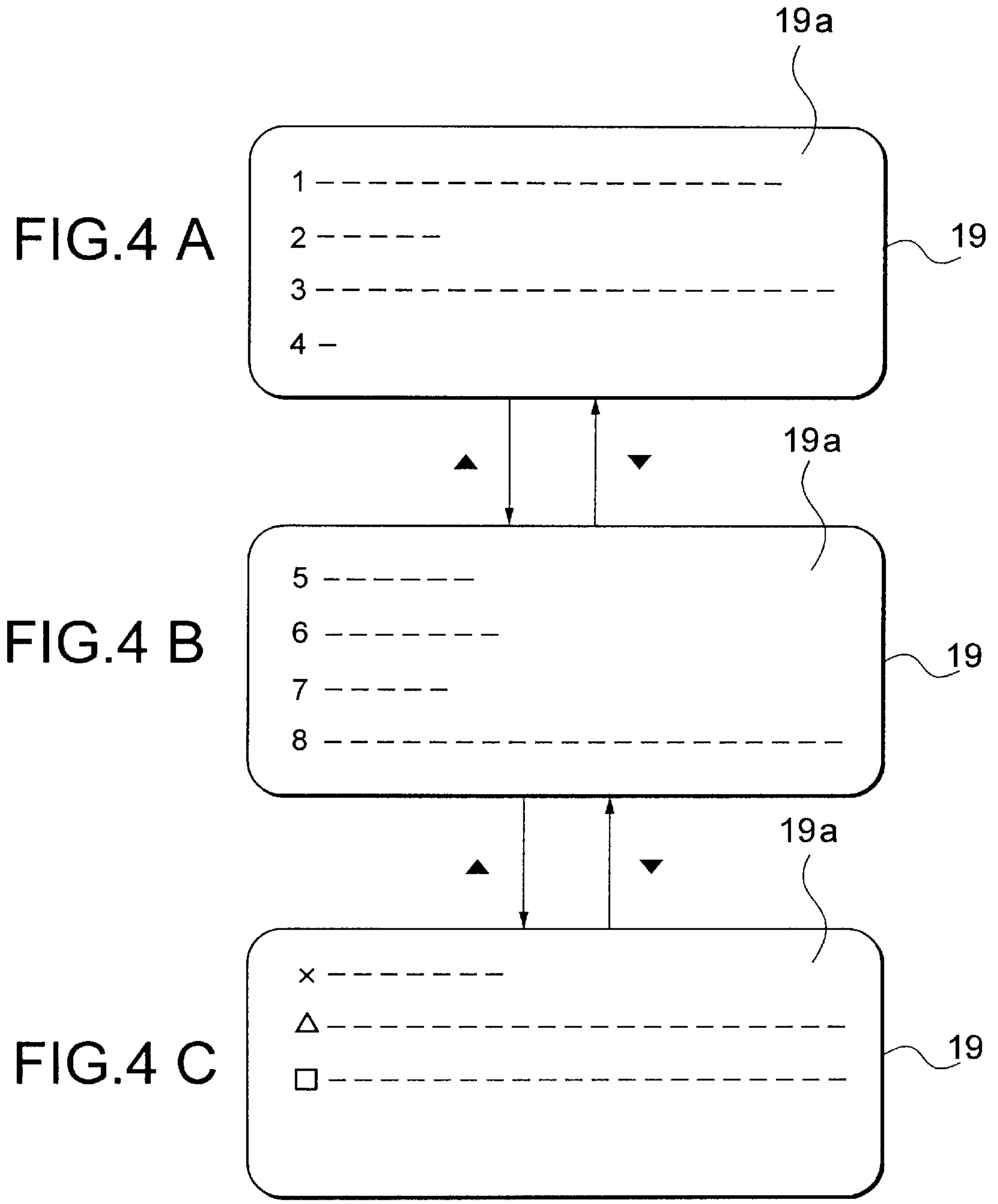
FIGS. 4A through 4C collectively show a displayed example for use in describing operation of the radio-paging receiver illustrated in FIG. 1.

Referring to FIGS. 4A through 4C, description will proceed to visual display of a bar graph or a bar chart for character numbers of the stored messages. In FIGS. 4A through 4C, the black downward triangular mark ▼ represents the message progressive switching operation while the black upward triangular mark ▲ represents the message back feed switching operation.

The CPU 25 divides the first through the x-th stored character numbers M1, M2, . . . , and Mx for the first through the x-th stored message, the total message character number Mt, and the remaining storable character number Ma stored in the RAM 24 by an arbitrary number P to calculate division results K1=M1/P, K2=M2/P, . . . , Kx=Mx/P, Kt=Mt/P, and Ka=Ma/P. In addition, in a case where a remainder occurs in the above-mentioned division operation, the division results K1, K2, . . . , and Kx for the first through the x-th stored character numbers M1, M2, . . . , and Mx and the division result Kt for the total message character number Mt are rounded up while the division result Ka for the remaining storable character number Ma is rounded down. In addition, the CPU 25 visually displays the character numbers with a bar graph on the LCD 19 via the LCD driver 26 by arranging a specific character (for instance, "-") on a screen 19*a* of the LCD 19 by the number corresponding to the division results K1 through Kx, Kt, and Ka as shown in FIGS. 4A through 4C. The specific character "-" is called a display character. At any rate, the LCD 19 acts in cooperation with the LCD driver 26 and the CPU 25 as a character number visual displaying arrangement for visually displaying the stored character number for each of the stored messages with analog representation.

In addition, the above-mentioned division results K1 through Kx, Kt, and Ka may be calculated on reception of the messages to store in the RAM 24 in the manner as the character numbers M1 to Ma. In a case where the division results K1 through Kx, Kt, and Ka are stored in the RAM 24, it is possible to decrease a software processing on visual display of the bar graph.

Preferably, the arbitrary number P may be a multiple of ten such as ten, twenty, or the like. This is because a user can easily recognize information indicative of the character numbers in a case where the specific characters are arranged on the screen 19*a* of the LCD 19. In addition, the arbitrary number P may desirably be set so that a bar (a string of the specific or display characters "-" is equal in number to the division result Ki) in the bar graph corresponding to the i-th stored character number Mi falls in a line of the screen 19*a* of the LCD 19. This is because the user can easily recognize information for each character number.

It will assumed that the bar graph dose not fall in the screen 19*a* of the LCD 19 because there is a lot of stored messages. In this event, the user can carry out scrolling to up or to down of the bar graph by operation of a message progressive switch or a message back feed switch in the switches 20 as illustrated in FIGS. 4A through 4C. First through fourth identification numbers for the first through the fourth stored character numbers M1 through M4 are indicated along a left-hand column in FIG. 4A by numerals 1 through 4. Fifth through eighth identification numbers for the fifth through the eighth stored character numbers M5 through M8 are indicated along a left-hand column in FIG. 4B. In FIG. 4C, symbols of "X", "Δ" and "□" along a left-hand column indicate a last or an x-th identification sign for the x-th stored character number Mx, a total identification sign for the total message character number Mt, and a remaining identification sign for the remaining storable character number Ma, respectively. In FIG. 4C, a bar for the x-th stored character number Mx of the last or the x-th stored message is visually displayed in a first or a top line on the screen 19*a* of the LCD 19. In addition, a bar for the total message character number Mt is visually displayed in a second line on the screen 19*a* of the LCD 19. Furthermore, a bar for the remaining storable character number Ma is visually displayed in a third of a last line on the screen 19*a* of the LCD 19.

Although both of the bars for the total message character number Mt and the remaining storable character number Ma are visually displayed on the screen 19*a* of the LCD 19 in the example being illustrated, the bar for the remaining storable character number Ma only may be visually displayed on the screen 19*a* of the LCD 19.

Figure 5A:
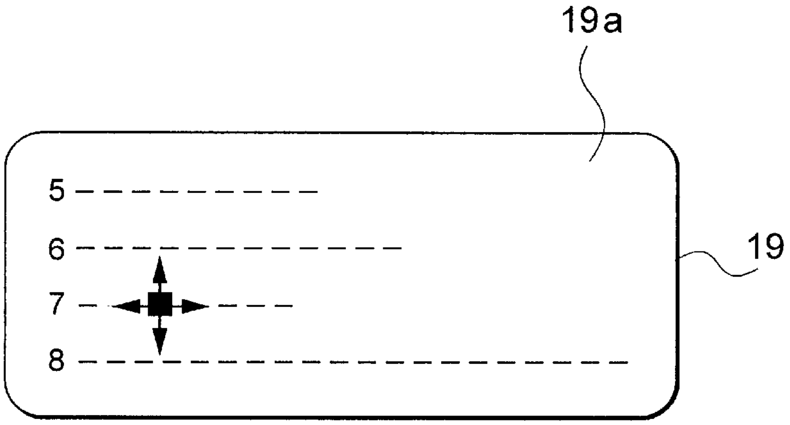
FIGS. 5A through 5C collectively show another displayed example for use in describing operation of the radio-paging receiver illustrated in FIG. 1.
Figure 5B:
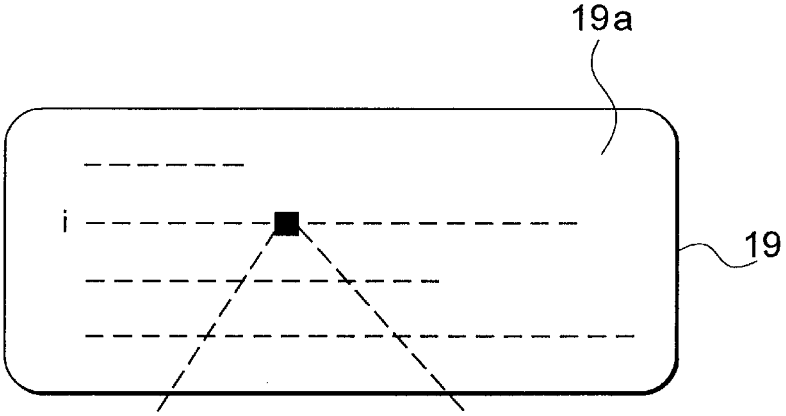
Figure 5C:
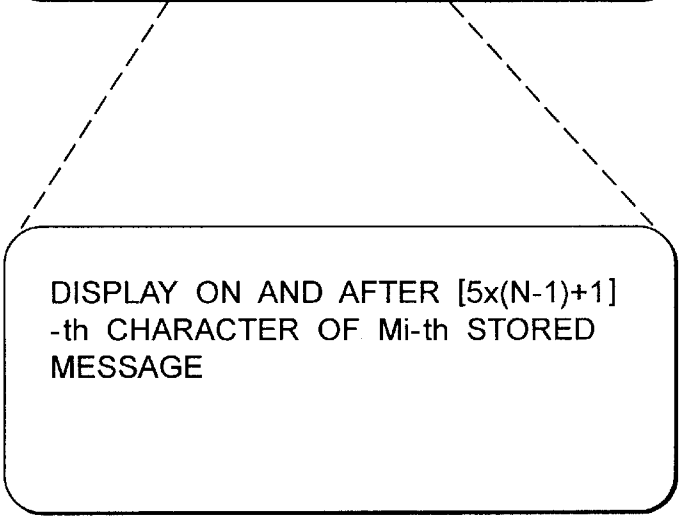

(B-3) Reading Out of the Stored Messages Using the Visual Display of the Bar Graph Referring to FIGS. 5A through 5C, description will proceed to reading out of the stored messages that is carried out using the visual display of the bar graph.

FIG. 5A shows a part of the bar graph for the character numbers that is visually displayed on the screen of the LCD 19. In FIG. 5A, a black square mark, namely, ■ is located on a seventh bar for the seventh stored character number M7 of the bar graph and represents a cursor. The user can move the cursor ■ by operating the switches 20. The cursor ■ can move left, right, up, or down in an area where the specific or the display characters "-" composing the bar graph are visually displayed. The CPU 25 detects, as a pointed-out point, a point which is pointed out by the cursor ■. Subsequently, the CPU 25 reads a part corresponding to the pointed-out point in the seventh stored message corresponding to the seventh bar on which the pointed-out point rides out of the RAM 24, and makes the LDC 19 visually display the part thereon.

In FIG. 5B, the cursor ■ is visually displayed in a position of an N-th specific character in a bar which indicates the i-th stored character number of the i-th stored message determined by a switching operation. FIG. 5C shows operation of message visual display in a case where a message reading is instructed by a predetermined switching operation in this state. In the example being illustrated, it is presumed that each specific character for use in the bar graph display has a character weight of five. Under the circumstances, the visual display for message is carried out on and after a $(5\times(N-1)+1)$-th character of the i-th stored message. In this case, when a switching operation for normal message display is carried out, the message display is carried out in the manner as prior art.

(B-4) Concrete Operation for this Embodiment

The description will proceed to concrete operation of the radio-paging receiver illustrated in FIG. 2 under the following conditions:

<Conditions> a. The maximum message number: 16
b. The maximum message length: 1,000 characters
c. The total storage character number: 16,000 character
d. The bar graph display character for the message character numbers: "-".
e. The number of characters corresponding to "-" is fifty
f. The LCD 19 has a capacity of 88 characters (4 lines of 22 characters per line)
g. The received message is represented by the alphanumeric code of 7 bits.
h. The switches 20 (FIG. 2) operated by the user are six switches, a menu display switch, the message progressive switch, the message back feed switch, a reading instruction switch, a left switch, and a right switch.
i. The received message storing area 202 in the RAM 24 initially stores, as the stored messages, the received messages as follows:
   1st stored message: 570 characters,
   2nd stored message: 30 characters,
   3rd stored message: 890 characters,
   4th stored message: 330 characters,
   5th stored message: 123 characters,
   6th stored message: 910 characters,
   7th stored message: 440 characters,
   8th stored message: 780 characters,
   9th stored message: 5 characters, and
   10th stored message: 210 characters.

Figure 6:
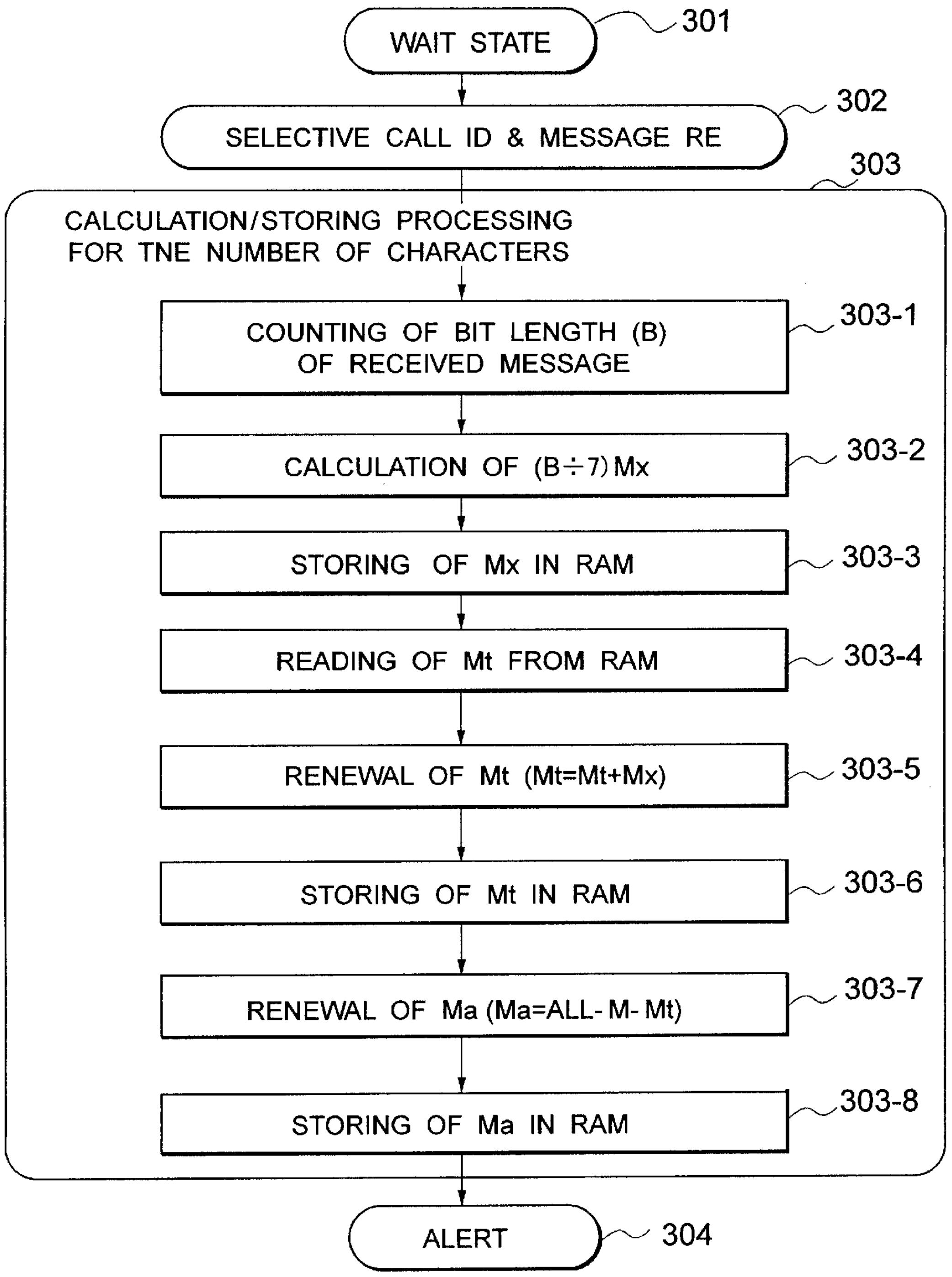
FIG. 6 is a flow chart for use in describing operation of the radio-paging receiver illustrated in FIG. 2.
Figure 7:
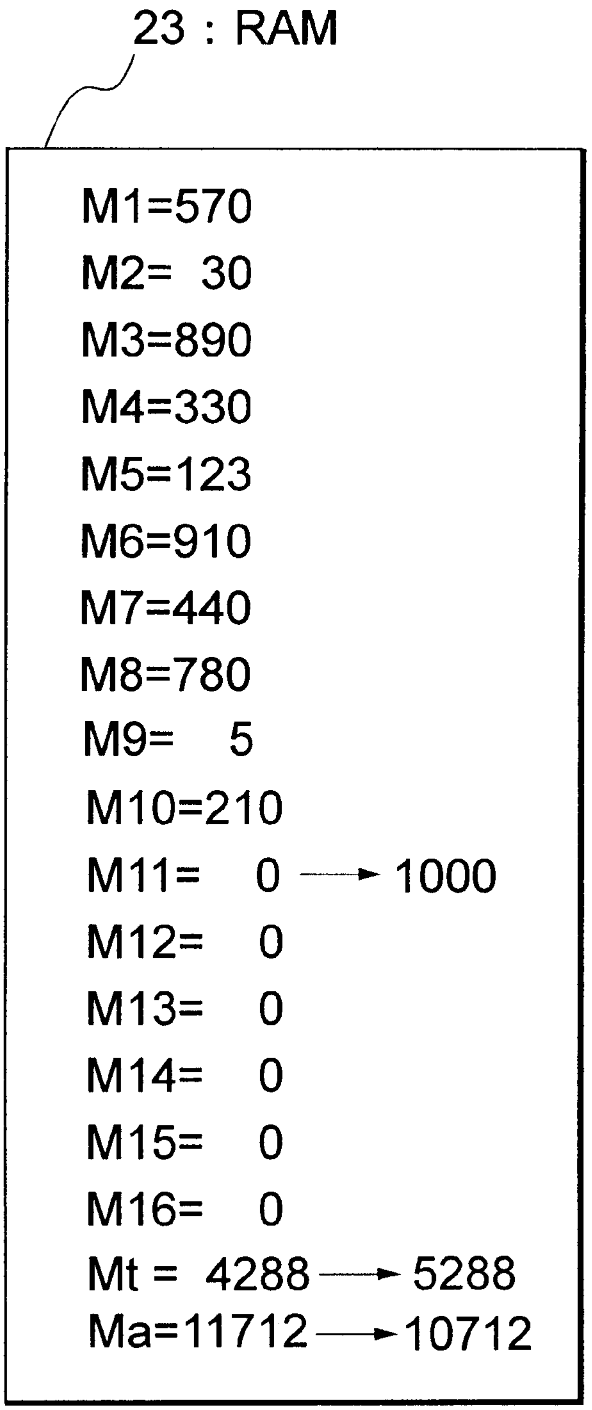
FIG. 7 shows an example of stored contents in the RAM for use in describing operation of the radio-paging receiver illustrated in FIG. 2.

Referring to FIGS. 6 and 7, the description will proceed to the concrete operation of the radio-paging receiver illustrated in FIG. 2 under the above-mentioned conditions. FIG. 6 is a flow chart for use in describing operation of the radio-paging receiver illustrated in FIG. 2. FIG. 7 is an example of stored contents in the RAM 24 shown in FIG. 2.

At first, the radio-paging receiver shown in FIG. 2 is put into a reception wait state at a step 301. Under the circumstances, it will be assumed that the radio-paging receiver receives a selective call signal including a selective call identifier (ID) and a message of 1,000 characters or 7,000 bits at a step 302. In this event, the CPU 25 carries out a calculation/storing processing for the number of characters as a step 303 in the manner which will be presently described. More specifically, the CPU 25 counts a bit length of 7,000 bits of the received eleventh messages consisting of 1,000 characters at a step 303-1. The step 303-1 is followed by a step 303-2 at which the CPU 25 calculates, as an eleventh stored character number M11, the number of characters for the eleventh stored message, namely, 1,000 characters. The step 303-2 proceeds to a step 303-3 at which the CPU 25 stores the eleventh stored character number M11 in the RAM 24 as shown in an eleventh line of FIG. 7.

Subsequently, the CPU 25 reads the remaining storable character number Ma of 11,712 out of the RAM 24 at a step 303-4. The step 303-4 is succeeded by a step 303-5 at which the CPU 25 carries out renewal of the total message character number or the accumulated character number Mt by adding the eleventh stored character number M11 from the accumulated character number Mt, namely, $$Mt=Mt+M11.$$

The step 303-5 is followed by a step 303-6 at which the CPU 25 stores the renewed accumulated character number Mt again as shown in a bottom line but one of FIG. 7. The step 303-6 proceeds to a step 303-7 at which the CPU 25 carries out renewal of the remaining storable character number Ma by subtracting the accumulated character number Mt from the total storage character number ALL-M, namely, $$Ma=ALL-M-Mt.$$

The step 303-7 is succeeded by a step 303-8 at which the CPU 25 stores the renewed remaining storable character number Ma as shown in the bottom line of FIG. 7.

The step 303 is followed by a step 304 at which the CPU 25 carries out alerting operation by driving one of the LED 15, the loudspeaker 16, and the vibrator 17 via the alert section 22 and the alert driver 18.

On reception of the selective call ID, the radio-paging receiver repeatedly carries out the above-mentioned operation to manage the character number for each stored message, the accumulated character number Mt, and the remaining storable character number Ma.

Referring to FIGS. 8A through 11B, description will be made as regards visual display of the bar graph by using the example described above. The visual display of the bar graph is called a message view. Proceeding to the message view is carried out by setting an item with a name of "MESSAGE VIEWS" or the like in a main menu/message menu or the like. In addition, the processing to the message view may be made by a switching operation on reading of the message from the wait state. In the example being illustrated, description will be made as regards the proceeding to the message view from the wait state or the message menu.

Figures 8A, 8B, 8C, 8D, 8E:
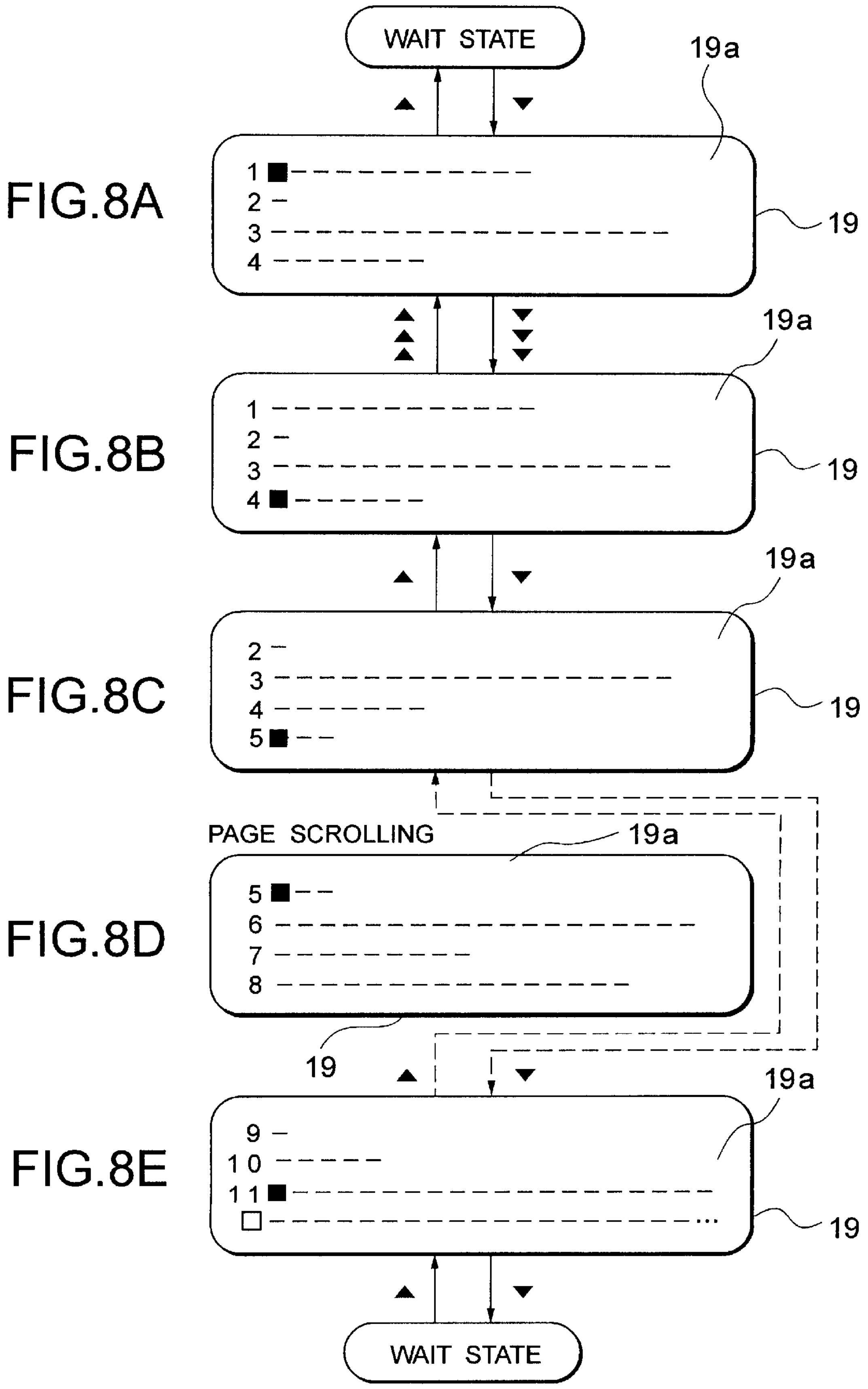
FIGS. 8A through 8E collectively show still another displayed example for use in describing operation of the radio-paging receiver illustrated in FIG. 2.

In FIG. 8A, the proceeding to the message view from the wait state is carried out by pushing the message progressive switch down. In this event, the CPU 25 calculates the number (Mi/50) of the display characters "-" on the basis of the i-th stored character number Mi for the i-th stored message.

The message view is visually displayed as shown in FIG. 8A and the cursor ■ is located on a first display character of the first stored character number M1 for the first stored message. The cursor ■ is moved left, right, up, or down in the display range of the display characters "-" by operating the message progressive switch, the message back feed switch, the left switch, or the right switch.

It will be presumed that the message progressive switch is pushed three times down. In this event, the cursor ■ moves downward and the message view is visually displayed as shown in FIG. 8B. It will be assumed that the message progressive switch is pushed one time down again. In this event, a line scrolling or a page scrolling is carried out as shown in FIGS. 8C or 8D, respectively. By carrying out the switching operation in the manner which is described above, it is possible to see or watch all of the stored character numbers M1 to M11 and the remaining storable character number Ma as shown in FIGS. 8A through 8E.

Inasmuch as the remaining storable character number Ma generally has a large number so that a bar for the remaining storable character number Ma is longer than a line on the screen 19*a* of the LCD 19, it is preferable to inform the user that there are a lot of display characters for the remaining storable character number Ma more than that corresponding to the screen by using a particular character " . . . " as shown in FIG. 8E. In addition, the cursor ■ cannot move on the display characters "-" and the particular character " . . . " both of which are used for indicating the remaining storable character number Ma. Inasmuch as the maximum message length is equal to 1,000 characters and each display character "-" corresponds to fifty characters, a bar for displaying each character number is never more than a line on the screen of the LCD 19.

Figures 9A, 9B, 9C:
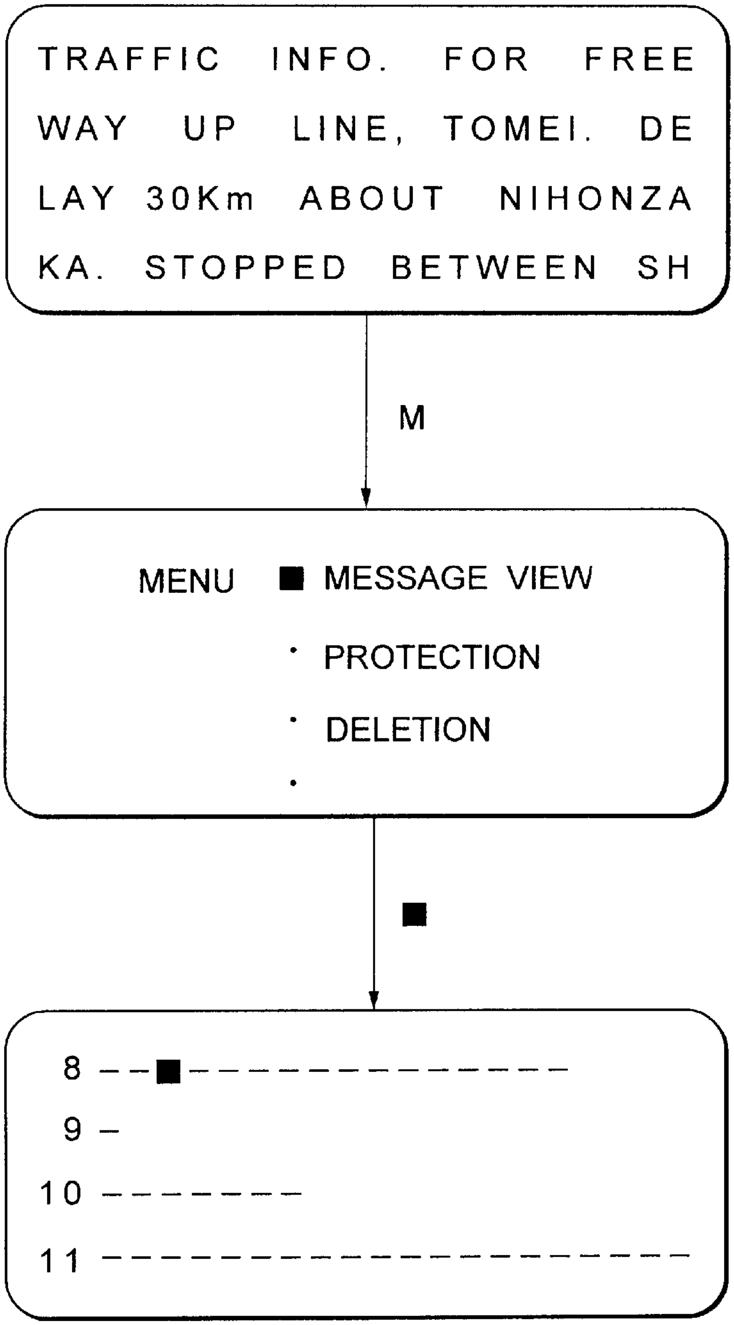
FIGS. 9A through 9C collectively show yet another displayed example for use in describing operation of the radio-paging receiver illustrated in FIG. 2.

It will be assumed that the message reading is carried out as shown in FIG. 9A. Under the circumstances, when the menu switch display switch is pushed down, visual display proceeds to the display of the message menu as shown in FIG. 9B. In the example being illustrated, the message menu has a choice of the message view, protection, deletion, and so on. When the message view is made the choice, the visual display proceeds to the message view as shown in FIG. 9C.

After proceeding to the message view, the cursor ■ is put on the display character "-" corresponding to the part of the stored message which is visually displayed on a top line of the screen of the LCD 19 before proceeding to the message menu. Thereafter, the similar operation to the above-mentioned message view operation is carried out.

Figure 10A:
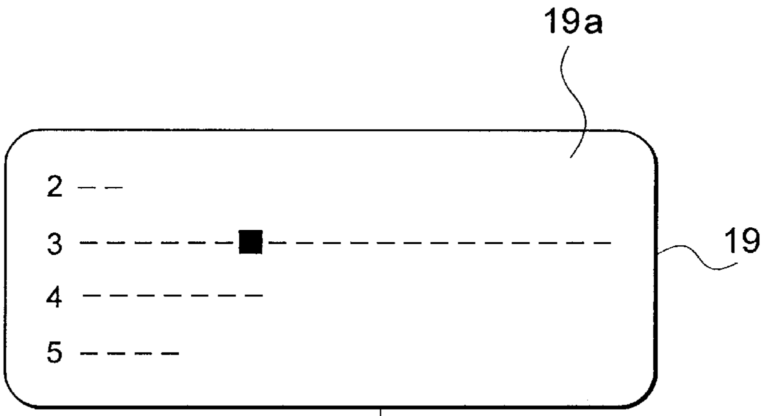
FIGS. 10A and 10B collectively show a further displayed example for use in describing operation of the radio-paging receiver illustrated in FIG. 2.
Figure 10B:
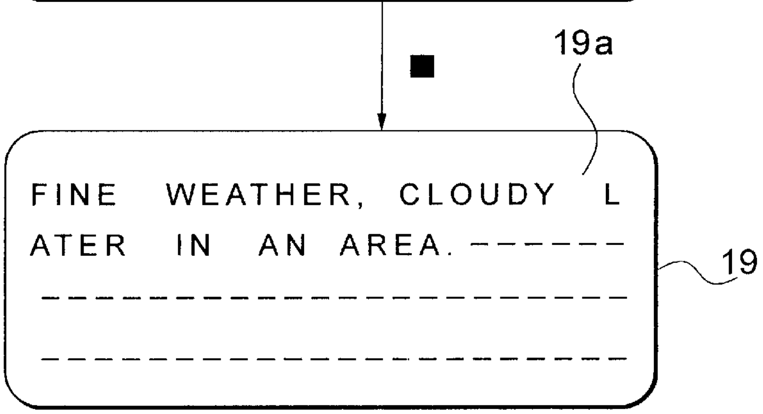

Referring to FIGS. 10A and 10B, description will proceed to operation in a case of carrying out the message reading from the message view. At first, the cursor ■ is moved by the switching operations to a desired portion to be read in the message view as shown in FIG. 10A. Thereafter, when the reading instruction switch is pushed down, the CPU 25 carries out the reading of a message part corresponding to the desired portion. That is, the CPU 25 acts in cooperation with the reading instruction switch as a detecting arrangement for detecting a point of the bar graph that is pointed out by the user. In the example being illustrated in FIG. 10A, the cursor ■ is located on a seventh display character of the bar indicative of the third stored character number M3 for the third stored message. Inasmuch as each display character "-" indicates fifty characters, the message reading is carried out so as to visually display a 301-th character in the third stored message on the screen 19*a* of the LCD 19 as an initial character as shown in FIG. 10B. That is, the LCD 19 is operable in cooperation with the CPU 25 and the LCD driver 26 as a message visual displaying arrangement for visually displaying a part of the stored messages corresponding to the point by reading the part out of the received message string area 202. In addition, after proceeding to the message reading, the message reading is carried out by the switching operations in the similar manner as operation of prior art.

Figure 11A:
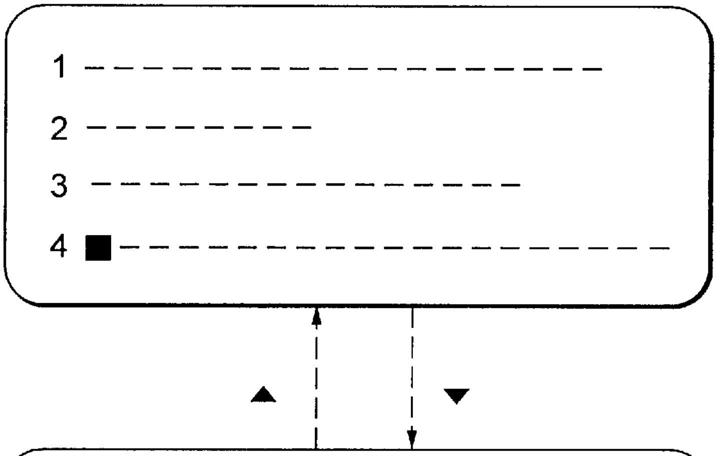
FIGS. 11A and 11B collectively show a yet further displayed example for use in describing operation of the radio-paging receiver illustrated in FIG. 2.
Figure 11B:
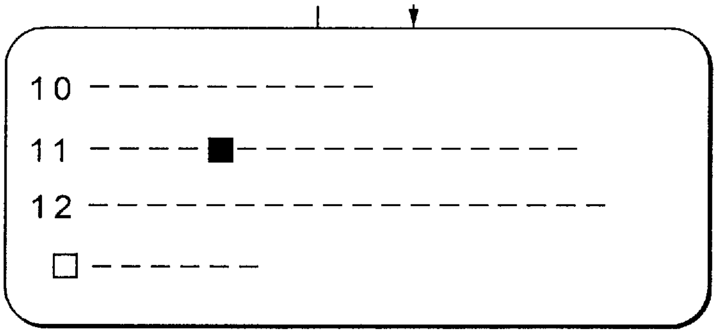

Referring to FIGS. 11A and 11B, description will proceed to operation of another radio-paging receiver, which has the following specifications:

<Specifications> a. The maximum message number: 16 b. The maximum message length: 1,000 characters c. The total storage character number: 8,000 character d. The display character for the bar graph of the message character numbers: "-"

e. The number of characters corresponding to "-" is fifty f. The LCD 19 has a capacity of 88 characters (4 lines of 22 characters per line)

g. The received message is represented by the alphanumeric code of 7 bits.

It will assumed that the received message storing area 202 in the RAM 24 already stores, as the stored messages, the received messages as follows:

1st stored message: 860 characters,

2nd stored message: 354 characters,

3rd stored message: 734 characters,

4th stored message: 950 characters,

5th stored message: 670 characters,

6th stored message: 129 characters,

7th stored message: 990 characters,

8th stored message: 246 characters,

9th stored message: 550 characters,

10th stored message: 489 characters.

11th stored message: 830 characters, and

12th stored message: 859 characters.

FIGS. 11A shows a state where the message view is visually display. When the switch operations are carried out so as to proceed to the visual display for the last message, six display characters "-" are visually displayed as a bar for the remaining storable character number Ma as shown in a bottom line of FIG. 11B. Under the circumstances, the user can obtain information so that remaining about 300 characters are storable in the received message storing area 202 of the RAM 24. This is because the user already understands that each display character "-" indicates or corresponds to fifty characters.

In the above-mentioned state, it will be assumed that a thirteenth message consisting of 300 characters or more is received in the radio-paging receiver next time. In this event, it will be understood that the twelfth stored message is deleted from the received message storing area 202 of the RAM 24 and then the thirteenth message is stored in the received message storing area 202 of the RAM 24 as a new stored message. Inasmuch as the user can predict that the twelfth stored message might be deleted on reception of the next message, the user can cope with this as follows. That is, if it is not objectionable that the twelfth stored message is deleted, the user may carry out no operation. On the other hand, if deletion of the twelfth stored message is in difficulty, operation of, for example, protection may be carried out by the user. When the operation of protection is carried out, it is possible for the user to cope with in the similar manner as regards one, which is danger of, be deleted next time.

While this invention has thus far been described in conjunction with a few preferred embodiments thereof, it will now be readily possible for those skilled in the art to put this invention into various other manners. For example, the stored character numbers for the respective stored messages may be visually displayed with analog representation such as graphical representation, for example, of a circle graph (a pie chart) other than the bar graph (the bar chart) although the stored character numbers for the respective stored messages are visually displayed with the bar graph in the above-mentioned embodiments.

What is claimed is:

1. A radio communication apparatus for successively receiving selective call signals each including a message which comprises a plurality of characters, said radio communication apparatus comprising:

receiving means for successively receiving the messages included in the respective selective call signals as received messages;

message storing means, connected to said receiving means, for storing the received messages therein as stored messages;

character number storing means, connected to said message storing means, for storing the number of characters for each of said stored messages therein as a stored character number;

character number visual displaying means, connected to said character number storing means, for visually displaying the stored character number for each of said stored messages thereon in a graphical representation;

detecting means, connected to said character number visual displaying means, for detecting a point on said graphical representation selected by a user; and message visual displaying means, connected to said detecting means and said message storing means, for visually displaying a part of the stored messages corresponding to the point by reading the part out of said message storing means.

2. A radio communication apparatus as claimed in claim 1, further comprising deleting means, connected to said message storing means, for deleting said stored messages from said message storing means.

3. A radio communication apparatus as claimed in claim 1, wherein said graphical representation comprises a bar graph.

4. A radio communication apparatus as claimed in claim 1, further comprising accumulating means, connected to said character number storing means, for accumulating the stored character numbers for said stored messages to obtain an accumulated character number, said character number visual displaying means visually displaying the accumulated character number and a corresponding stored character number.

5. A radio communication apparatus as claimed in claim 4, further comprising calculating means, connected to said accumulating means, for calculating, on the basis of the accumulated character number, the number of characters capable of being stored in said message storing means to produce a remaining storable character number, said character number visual displaying means graphically displaying the remaining storable character number.

6. A radio communication apparatus as claimed in claim 1, further comprising:

accumulating means, connected to said character number storing means, for accumulating the stored character numbers for said stored messages to obtain an accumulated character number; and calculating means, connected to said accumulating means, for calculating, on the basis of the accumulated character number, the number of characters capable of being stored in said message storing means to produce a remaining storable character number, said character number visual displaying means graphically displaying the remaining storable character number.

7. A radio communication apparatus for successively receiving selective call signals each including a message which comprises a plurality of characters, said radio communication apparatus comprising:

a receiver successively receiving the messages included in the respective selective call signals as received messages;

a received message storing area, connected to said receiver, storing the received messages therein as stored messages;

a character number information storing area, connected to said received message storing area, storing the number of characters for each of said stored messages therein as a stored character number; and a visual display device, connected to said character number information storing area, visually displaying the stored character number for each of said stored messages thereon in a graphical representation; and a detector, connected to said visual display device, detecting a point on said graphical representation selected by a user, said visual display device visually displaying a part of the stored messages corresponding to the point by reading the part out of said received message storing area.

8. A radio communication apparatus as claimed in claim 7, further comprising a deleter, connected to said received message storing area, deleting said stored messages from said received message storing area.

9. A radio communication apparatus as claimed in claim 7, wherein said graphical representation comprises a bar graph.

10. A radio communication apparatus as claimed in claim 7, further comprising an accumulator, connected to said character number information storing area, accumulating the stored character numbers for said stored messages to obtain an accumulated character number, said visual display device visually displaying the accumulated character number and a corresponding stored character numbers.

11. A radio communication apparatus as claimed in claim 10, further comprising a calculator, connected to said accumulator, calculating, on the basis of the accumulated character number, the number of characters capable of being stored in said received message storing area to produce a remaining storable character number, said visual display device graphically displaying the remaining storable character number.

12. A radio communication apparatus as claimed in claim 7, further comprising:

an accumulator, connected to said character number information storing area, accumulating the stored character numbers for said stored messages to obtain an accumulated character number; and a calculator, connected to said accumulator, calculating, on the basis of the accumulated character number, the number of characters capable of being stored in said received message storing area to produce a remaining storable character number, said visual display device graphically displaying the remaining storable character number.

13. A method of visually displaying a character number in a radio communication apparatus for successively receiving selective call signals each including a message which comprises a plurality of characters, said method comprising the steps of:

successively receiving the messages included in the respective selective call signals as received messages;

storing the received messages in a memory as stored messages;

storing the number of characters for each of said stored messages in said memory as a stored character number;

visually displaying the stored character number for each of said stored messages on a display device in a graphical representation;

detecting a point on said graphical representation selected by a user; and visually displaying a part of the stored messages corresponding to the point by reading the part out of said memory.

14. A method as claimed in claim 13, further comprising the step of deleting said stored messages from said memory.

15. A method as claimed in claim 13, wherein said graphical representation comprises a bar graph.

16. A method as claimed in claim 13, further comprising the step of accumulating the stored character numbers for said stored messages to obtain an accumulated character number, said visually displaying step visually displaying the accumulated character number and a corresponding stored character numbers on said display device.

17. A method as claimed in claim 16, further comprising the step of calculating, on the basis of the accumulated character number, the number of characters capable of being stored in said memory to produce a remaining storable character number, said visually displaying step graphically displaying the remaining storable character number on the display device.

18. A method as claimed in claim 13, further comprising the steps of:

accumulating the stored character numbers for said stored messages to obtain an accumulated character number; and calculating, on the basis of the accumulated character number, the number of characters capable of being stored in said memory to produce a remaining storable character number, said visually displaying step graphically displaying the remaining storable character number on the display device.

* * * * *